(12) United States Patent
Marin et al.

(10) Patent No.: US 7,538,167 B2
(45) Date of Patent: *May 26, 2009

(54) SYNDIOTACTIC POLYPROPYLENE AND METHODS OF PREPARING SAME

(75) Inventors: Vladimir Marin, Houston, TX (US); Abbas Razavi, Mons (BE)

(73) Assignee: Fina Technology, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/552,020

(22) Filed: Oct. 23, 2006

(65) Prior Publication Data

US 2008/0097052 A1    Apr. 24, 2008

(51) Int. Cl.
*C08F 4/42*        (2006.01)
*C08F 110/06*    (2006.01)

(52) U.S. Cl. .................. 526/160; 526/170; 526/943; 526/351

(58) Field of Classification Search .............. 526/160, 526/170, 943, 351
See application file for complete search history.

(56) References Cited

U.S. PATENT DOCUMENTS

| | | | |
|---|---|---|---|
| 4,271,060 A | 6/1981 | Hubby | |
| 4,404,344 A | 9/1983 | Sinn et al. | |
| 4,543,399 A | 9/1985 | Jenkins, III et al. | |
| 4,588,790 A | 5/1986 | Jenkins, III et al. | |
| 4,767,735 A | 8/1988 | Ewen et al. | |
| 4,774,277 A | 9/1988 | Janac et al. | |
| 5,001,205 A | 3/1991 | Hoel | |
| 5,028,670 A | 7/1991 | Chinh et al. | |
| 5,155,080 A | 10/1992 | Elder et al. | |
| 5,236,998 A | 8/1993 | Lundeen et al. | |
| 5,317,036 A | 5/1994 | Brady, III et al. | |
| 5,352,749 A | 10/1994 | DeChellis et al. | |
| 5,405,922 A | 4/1995 | DeChellis et al. | |
| 5,436,304 A | 7/1995 | Griffin et al. | |
| 5,456,471 A | 10/1995 | MacDonald | |
| 5,462,999 A | 10/1995 | Griffin et al. | |
| 5,525,678 A | 6/1996 | Mink et al. | |
| 5,589,555 A | 12/1996 | Zboril et al. | |
| 5,616,661 A | 4/1997 | Eisinger et al. | |
| 5,627,242 A | 5/1997 | Jacobsen et al. | |
| 5,665,818 A | 9/1997 | Tilston et al. | |
| 5,668,228 A | 9/1997 | Chinh et al. | |
| 5,677,375 A | 10/1997 | Rifi et al. | |
| 6,147,173 A | 11/2000 | Holtcamp | |
| 6,180,735 B1 | 1/2001 | Wenzel | |
| 6,207,606 B1 | 3/2001 | Lue et al. | |
| 6,211,105 B1 | 4/2001 | Holtcamp | |
| 6,242,545 B1 | 6/2001 | Jejelowo et al. | |
| 6,245,705 B1 | 6/2001 | Kissin | |
| 6,245,868 B1 | 6/2001 | Agapiou et al. | |
| 6,248,845 B1 | 6/2001 | Loveday et al. | |
| 6,271,323 B1 | 8/2001 | Loveday et al. | |
| 6,274,684 B1 | 8/2001 | Loveday et al. | |
| 6,300,436 B1 | 10/2001 | Agapiou et al. | |
| 6,339,134 B1 | 1/2002 | Crowther et al. | |
| 6,340,730 B1 | 1/2002 | Murray et al. | |
| 6,346,586 B1 | 2/2002 | Agapiou et al. | |
| 6,359,072 B1 | 3/2002 | Whaley | |
| 6,372,344 B1 | 4/2002 | Castellani et al. | |
| 6,380,328 B1 | 4/2002 | McConville et al. | |
| 6,420,580 B1 | 7/2002 | Holtcamp et al. | |
| 6,465,386 B1 | 10/2002 | Maddox et al. | |
| 6,469,188 B1 | 10/2002 | Miller et al. | |
| 6,693,153 B2 | 2/2004 | Miller et al. | |
| 6,800,707 B2 * | 10/2004 | Razavi | ......................... 526/160 |
| 7,060,766 B2 | 6/2006 | McCullough et al. | |
| 7,250,478 B2 | 7/2007 | Razavi | |
| 2005/0148460 A1 * | 7/2005 | Marin et al. | ................. 502/152 |
| 2006/0020067 A1 | 1/2006 | Brant et al. | |
| 2006/0270812 A1 * | 11/2006 | Tohi et al. | ................... 526/127 |

FOREIGN PATENT DOCUMENTS

| | | | |
|---|---|---|---|
| WO | WO 2005/100410 A1 | * | 10/2005 |
| WO | WO 2005/100419 | * | 10/2005 |
| WO | WO 2006/098452 A1 | * | 9/2006 |

OTHER PUBLICATIONS

Hlatky, Gregory G., "Heterogeneous Single Site Catalysts for Olefin Polymerization," Chemical Reviews, vol. 100, 2000, American Chemical Society, pp. 1347-1376.

U.S. Appl. No. 11/205,934, filed Aug. 17, 2005, entitled "Preparation and Use of Tetrasubstituted Fluorenyl Catalysts for Polymerization of Olefins."

* cited by examiner

*Primary Examiner*—Ling-Siu Choi
(74) *Attorney, Agent, or Firm*—Diane L. Kilpatrick-Lee

(57) ABSTRACT

A syndiotactic polypropylene comprising a melting temperature of greater than 160° C., a percentage of syndiotactic pentads greater than 95%, a toluene soluble fraction of equal to or less than 0.4, and a molecular weight of from 10,000 Daltons to 1,000,000 Daltons. A syndiotactic polypropylene comprising a melting temperature of greater than 170° C., a molecular weight of from 100,000 Daltons to 300,000 Daltons, a molecular weight distribution of less than 3, and a toluene soluble fraction of less than 0.4. A syndiotactic polypropylene comprising a tensile modulus of equal to or greater than 60,000 psi, a tensile strength at yield of equal to or greater than 3,600 psi, a tensile strength at break of equal to or greater than 3,900 psi, an elongation at yield of equal to or greater than 13%, and an elongation at break of equal to or greater than 400%.

18 Claims, 7 Drawing Sheets

SYNDIOTACTIC POLYPROPYLENE AND METHODS OF PREPARING SAME

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

1. Technical Field

This disclosure relates to polymeric compositions. More specifically, this disclosure relates to stereoregular polypropylene and methods of producing same.

2. Background

Olefin polymers and copolymers such as polyethylene, polypropylene and ethylene-propylene can be produced under various polymerization conditions and employing various polymerization catalysts. In the case of $C_3$ or greater alpha olefins, the resulting polymer may exhibit stereoregularity. For example, in the case of propylene, a polypropylene product may be isotactic wherein each methyl group attached to the tertiary carbon atoms of the successive monomeric unit falls on the same side of a hypothetical plane through the main chain of the polymer. Polypropylene may also be syndiotactic wherein the methyl groups attached to the tertiary carbon atoms of the successive monomeric unit are arranged as racemic dyads. In other words, the methyl groups in isotactic polypropylene lie on the same side of the polymer backbone whereas in syndiotactic polypropylene the methyl groups lie on alternate sides of the polymer backbone. In the absence of any regular arrangement of the methyl groups with respect to the polymer backbone the polymer is atactic.

Various factors influence the utility of a polymer product. For example, the stereoregularity of the polymeric product impacts both the physical and mechanical properties of said product. Additional factors that affect the utility of the polymer product include the melting temperature, crystallinity and melt flow rate. The combination of these and other factors determine the suitability of the polymer product for a particular plastics shaping process. Thus, a need exists for improved stereoregular polymeric materials designed for high performance in plastic shaping processes.

BRIEF SUMMARY OF SOME OF THE EMBODIMENTS

Disclosed herein is a syndiotactic polypropylene comprising a melting temperature of greater than 160° C., a percentage of syndiotactic pentads greater than 95%, a toluene soluble fraction of equal to or less than 0.4, and a molecular weight of from 10,000 Daltons to 1,000,000 Daltons.

Also disclosed herein is a syndiotactic polypropylene comprising a melting temperature of greater than 170° C., a molecular weight of from 100,000 Daltons to 300,000 Daltons, a molecular weight distribution of less than 3, and a toluene soluble fraction of less than 0.4.

Further disclosed herein is a syndiotactic polypropylene comprising a tensile modulus of equal to or greater than 60,000 psi, a tensile strength at yield of equal to or greater than 3,600 psi, a tensile strength at break of equal to or greater than 3,900 psi, an elongation at yield of equal to or greater than 13%, and an elongation at break of equal to or greater than 400%.

The foregoing has outlined rather broadly the features and technical advantages of the present disclosure in order that the detailed description of the embodiments that follows may be better understood. Additional features and advantages of the embodiments will be described hereinafter that form the subject of the claims of the disclosure. It should be appreciated by those skilled in the art that the conception and the specific embodiments disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims.

DETAILED DESCRIPTION OF THE EMBODIMENTS

Figure 1:
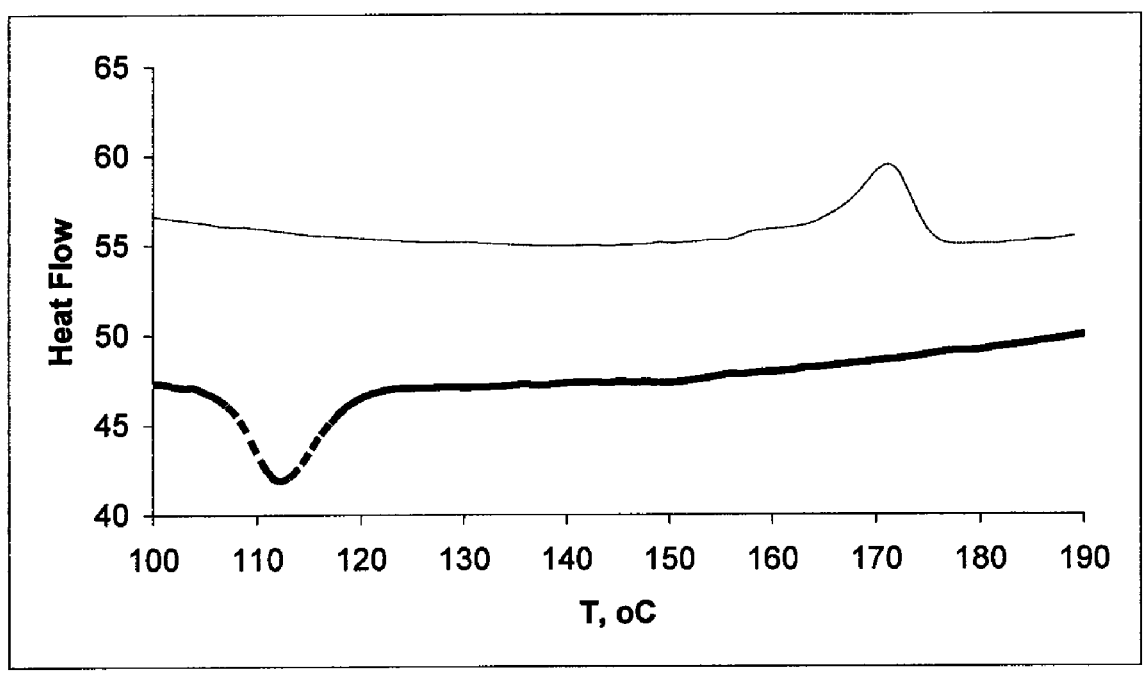
FIG. 1 is a differential scanning calorimetry plot for Sample #8.

Various terms as used herein are shown below. To the extent a term used in a claim is not defined below, it should be given the broadest definition persons in the pertinent art have given that term as reflected in printed publications and issued patents. Further, unless otherwise specified, all compounds described herein may be substituted or unsubstituted and the listing of compounds includes derivatives thereof.

The term "activity" generally refers to the weight of product produced per weight of the catalyst used in a process per hour of reaction at a standard set of conditions (e.g., grams product/gram catalyst/hr).

The term "substituted" refers to an atom, radical or group replacing hydrogen in a chemical compound.

The term "homogenous polymerization" refers to polymerization via contact with a catalyst that is present within the reaction system in the same phase as the reactants (e.g., a catalyst in solution within a liquid phase reaction.)

The term "tacticity" refers to the arrangement of pendant groups in a polymer. For example, a polymer is "atactic" when its pendant groups are arranged in a random fashion on both sides of the chain of the polymer. In contrast, a polymer is "isotactic" when all of its pendant groups are arranged on the same side of the chain and "syndiotactic" when its pendant groups alternate on opposite sides of the chain.

As used herein, "isotacticity" is measured via $^{13}C$ NMR spectroscopy using meso pentads and is expressed as percentage of meso pentads (% mmmm). As used herein, the term "meso pentads" refers to successive methyl groups located on the same side of the polymer chain. Syndiotactity may also be measured by $^{13}C$ NMR spectroscopy and may be expressed as the percentage of syndio pentads (% rrrr). As used herein, the term "syndio pentads" refers to successive methyl groups located on alternate sides of the polymer chain.

As used herein, "molecular weight distribution" is the ratio of the weight average molecular weight to the number average molecular weight (Mw/Mn) of a polymer and may also be referred to as the polydispersity index.

As used herein, "melting temperature" is measured by differential scanning calorimetry using a modified version of ASTM D 3418-99. Specifically, for a sample weighing between 5 and 10 g, the following standard test conditions involved heating the sample from 50° C. to 210° C. to erase the thermal history of the sample, followed by holding the sample at 210° C. for 5 minutes. The sample is then cooled to 50° C. to induce recrystallization and subsequently subjected to a second melt in the temperature range 50° C. to 190° C. For each of these temperature changes, the temperature is ramped at a rate of 10° C./min.

Disclosed herein are compositions and methods for the formation of stereoregular polypropylene. In an embodiment, the stereoregular polypropylene is syndiotactic polypropylene (sPP) having desirable characteristics such as high crystallinity, high melting temperature and high tacticity. Such characteristics will be discussed in detail later herein. In an embodiment, sPPs of the type disclosed herein may be formed through the use of fluorenyl-type metallocene catalysts which have been disclosed in U.S. patent application Ser. No. 11/205,934 filed Aug. 17, 2005 which is incorporated by reference in its entirety herein. The sPPs of this disclosure may exhibit high performance when subjected to a plastics shaping process such as for example injection molding.

In an embodiment, a sPP may be formed through the use of a metallocene catalyst, alternatively a fluorenyl-type metallocene catalyst (FMC). The FMC may be used in conjunction with one or more cocatalysts to form a catalyst system. A catalyst system herein refers to one or more chemical agents, which operate in concert to increase the rate of a reaction. Catalyst systems comprising an FMC of the type disclosed herein may be used to catalyze the polymerization of propylene into sPP. Once the catalyst system is prepared, as will be described and/or as known to one skilled in the art, a variety of processes may be carried out using the catalyst system. The equipment, process conditions, reactants, additives and other materials used in polymerization processes can be varied depending on the specific process.

The polymerization of propylene to form sPP may be carried out using solution phase, gas phase, slurry phase, bulk phase, high pressure processes or combinations thereof, for example. A detailed description of these processes is given in U.S. Pat. Nos. 5,525,678, 6,420,580, 6,380,328, 6,359,072, 6,346,586, 6,340,730, 6,339,134, 6,300,436, 6,274,684, 6,271,323, 6,248,845, 6,245,868, 6,245,705, 6,242,545, 6,211,105, 6,207,606, 6,180,735 and 6,147,173, which are incorporated by reference herein. Examples of solution processes are described in U.S. Pat. Nos. 4,271,060, 5,001,205, 5,236,998 and 5,589,555, which are incorporated by reference herein.

One example of a gas phase polymerization process includes a continuous cycle system, wherein a cycling gas stream (otherwise known as a recycle stream or fluidizing medium) is heated in a reactor by heat of polymerization. The heat is removed from the cycling gas stream in another part of the cycle by a cooling system external to the reactor. The cycling gas stream containing one or more monomers may be continuously cycled through a fluidized bed in the presence of a catalyst under reactive conditions. The cycling gas stream is generally withdrawn from the fluidized bed and recycled back into the reactor. Simultaneously, polymer product may be withdrawn from the reactor and fresh monomer may be added to replace the polymerized monomer. The reactor pressure in a gas phase process may vary from 100 psig to 500 psig, or from 200 psig to 400 psig or from 250 psig to 350 psig, for example. The reactor temperature in a gas phase process may vary from −30° C. to 120° C., or from 60° C. to 115° C., or from 70° C. to 110° C. or from 70° C. to 95° C., for example. A more detailed description of gas phase polymerization processes is given in U.S. Pat. Nos. 4,543,399, 4,588,790, 5,028,670, 5,317,036, 5,352,749, 5,405,922, 5,436,304, 5,456,471, 5,462,999, 5,616,661, 5,627,242, 5,665,818, 5,677,375 and 5,668,228, which are incorporated by reference herein.

Slurry phase processes generally include forming a suspension of solid, particulate polymer in a liquid polymerization medium, to which monomers and optionally hydrogen, along with catalyst, are added. The suspension (which may include diluents) may be intermittently or continuously removed from the reactor where the volatile components can be separated from the polymer and recycled, optionally after a distillation, to the reactor. The liquefied diluent employed in the polymerization medium may include a $C_3$ to $C_7$ alkane (e.g., hexane or isobutene), for example. The medium employed is generally liquid under the conditions of polymerization and relatively inert. A bulk phase process is similar to that of a slurry process. However, a process may be a bulk process, a slurry process or a bulk slurry process, for example.

As stated previously, hydrogen may be added to the process for a variety of reasons. For example, hydrogen may be added to increase the melt flow of the resultant polymer or to increase the catalyst activity. In an embodiment, hydrogen may be present in the reaction mixture in order to modify the molecular weight of the polymer product. In such embodiments, hydrogen may be present in the reaction mixture in an amount of from 0 to 400 ppm, alternatively from 5 ppm to 200 ppm, alternatively from 10 ppm to 150 ppm. In an embodiment, the polymerization reaction may be conducted at a temperature of from −20° C. to 100° C., alternatively at a temperature of greater than 60° C., alternatively at a temperature of greater than 70° C., alternatively at a temperature of greater than 80° C., alternatively at a temperature of greater than 90° C., alternatively greater than 100° C.

In a specific embodiment, a slurry process or a bulk process may be carried out continuously in one or more loop reactors. The catalyst, as slurry or as a dry free flowing powder, may be injected regularly to the reactor loop, which can itself be filled with circulating slurry of growing polymer particles in a diluent, for example. The loop reactor may be maintained at a pressure of from 27 bar to 45 bar and a temperature of from 38° C. to 121° C., for example. Reaction heat may be removed through the loop wall via any method known to one skilled in the art, such as via a double-jacketed pipe.

Alternatively, other types of polymerization processes may be used, such as stirred reactors in series, parallel or combinations thereof, for example. Upon removal from the reactor, the polymer may be passed to a polymer recovery system for further processing, such as addition of additives and/or extrusion, for example.

In an embodiment, an sPP may be formed using an FMC catalyst. The FMC catalyst may comprise a primary fluorenyl group that is a tetra-substituted fluorenyl group which is bridged to a secondary ligand structure which is a substituted or unsubstituted cyclopentadienyl, indenyl or fluorenyl group or a heteroorgano group. The tetra-substituted fluorenyl groups may be symmetrical with respect to a plane of symmetry through the bridge and the transition metal. In an embodiment, the substituents at the 2,7 positions are bulkier than the substituents at the 3,6 positions. However, a reverse relationship of substitution may be employed in some instances. In this case, the primary fluorenyl group may be substituted at the 2 and 7-positions with a $C_1$-$C_3$ alkyl group and at the 3 and 6-positions with a bulky hydrocarbyl group containing at least 4 carbon atoms. More specifically, an FMC suitable for use in the present disclosure may comprise metallocene ligand structures which incorporate tetra-substituted fluorenyl groups substituted at least in the 2,7 and 3,6 positions which are bridged to substituted or unsubstituted cyclopentadienyl, indenyl, fluorenyl or heteroorgano groups and which are characterized in terms of symmetry (or asymmetry) with reference to a plane of symmetry extending through the bridge and the transition metal. The FMC may incorporate transition metals from Groups 4 or 5 of the Periodic Table of Elements (according to IUPAC convention, new notation) alternatively, transition metals from Group 4 of the Periodic Table of Elements. In an embodiment the transition metal comprises titanium, zirconium or hafnium, alternatively zirconium.

In an embodiment, an FMC suitable for use in the preparation of sPPs of this disclosure is characterized by the general formula:

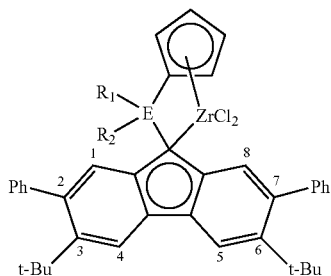

wherein E is a —C— group or an —Si— group and, $R^1$ and $R^2$ are each independently a hydrogen, an alkyl $C_1$-$C_{20}$, a cyclic $C_5$-$C_{20}$ group, an aryl group $C_6$-$C_{30}$ or combinations thereof.

Examples of FMCs suitable for use in the preparation of sPPs of this disclosure are Catalysts 1 and 2 whose structures are shown below:

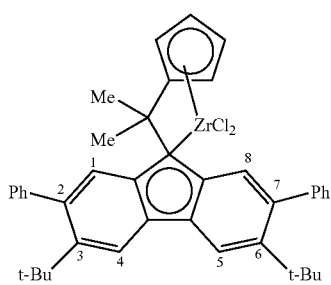

Catalyst 1

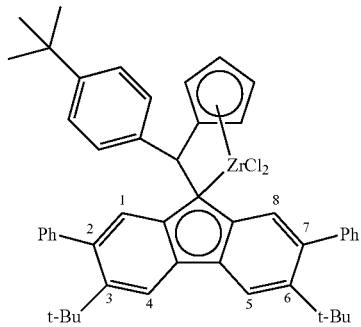

Catalyst 2

FMCs of the type disclosed herein have been described in detail in U.S. patent application Ser. No. 11/205,934 filed Aug. 17, 2005 which was previously incorporated herein.

In an embodiment a catalyst system for the production of an sPP of this disclosure comprises a cocatalyst. In employing the catalyst components of the present disclosure (i.e. FMCs) in polymerization procedures, they may be used in conjunction with an activating co-catalyst. Suitable activating co-catalysts may take the form of co-catalysts that are commonly employed in metallocene-catalyzed polymerization reactions. Thus, the activating co-catalyst may take the form of an aluminum co-catalyst such as for example and without limitation alumoxane co-catalysts. Alumoxane co-catalysts are also referred to as aluminoxane or polyhydrocarbyl aluminum oxides. Such compounds include oligomeric or polymeric compounds having repeating units as indicated by the chemical formula shown in the formula X:

(X)

where R is an alkyl group comprising from 1 to 5 carbon atoms. Alumoxanes are well known in the art and are generally prepared by reacting an organo-aluminum compound with water, although other synthetic routes are known to those skilled in the art. Alumoxanes may be either linear polymers or they may be cyclic, as disclosed for example in U.S. Pat. No. 4,404,344. Thus, alumoxane is an oligomeric or polymeric aluminum oxy compound containing chains of alternating aluminum and oxygen atoms whereby the aluminum carries a substituent, such as an alkyl group. The structure of linear and cyclic alumoxanes is generally believed to be represented by the general formula —Al(R)—O)$_m$ for a cyclic alumoxane, and $R_2$Al—O—(Al(R)—O)$_m$—AlR$_2$ for a linear compound wherein each R may independently comprise a $C_1$-$C_{10}$ hydrocarbyl, alternatively, an alkyl group, a halide or combinations thereof and m is an integer ranging from 1 to 50, alternatively m is 4. Alumoxanes also exist in the configuration of cage or cluster compounds.

Alumoxanes are typically the reaction products of water and an aluminum alkyl, which in addition to an alkyl group may contain halide or alkoxide groups. Reacting several different aluminum alkyl compounds, such as, for example, trimethylaluminum and tri-isobutylaluminum, with water yields so-called modified or mixed alumoxanes. Examples of alumoxanes suitable for use in this disclosure are methylalumoxane and methylalumoxane modified with minor amounts of other higher alkyl groups such as isobutyl. Alumoxanes generally contain minor to substantial amounts of the starting aluminum alkyl compounds. In an embodiment, the co-catalyst comprises poly (methylaluminum oxide), which may be prepared either from trimethylaluminum or tri-isobutylaluminum. Poly (methylaluminum oxide) may also be referred to as poly (isobutylaluminum oxide).

The alkyl alumoxane co-catalyst and transition FMC are employed in any suitable amounts to provide an olefin polymerization catalyst. Suitable aluminum: FMC mole ratios are within the range of 10:1 to 20,000:1 alternatively, within the range of 50:1 to 10,000:1, alternatively, within the range of 100:1 to 5,000:1. Normally, the FMC component and the alumoxane, or other activating co-catalyst as described below, are mixed prior to introduction in the polymerization reactor in a mode of operation such as described in U.S. Pat. No. 4,767,735 which is incorporated by reference herein in its entirety. Other suitable activating co-catalysts which can be used include those catalysts which function to form a catalyst cation with an anion comprising one or more boron atoms. By way of example, the activating co-catalyst may take the form of boron-containing activator such as triphenylcarbenium tetrakis(pentafluorophenyl) boronate which is disclosed in U.S. Pat. No. 5,155,080. As described there, the activating co-catalyst produces an anion which functions as a stabilizing anion in a transition metal catalyst system. Further suitable activators for the above metal complexes include strong Lewis acids including tris(perfluorophenyl)borane and tris (perfluorobiphenyl)borane. Suitable noncoordinating anions include [W(PhF$_5$)]$^-$, [Mo(PhF$_5$)]$^-$ (wherein PhF$_5$ is pentafluorophenyl), [ClO$_4$]$^-$, [S$_2$O$_6$]$^-$, [PF$_6$]$^-$, [SbR$_6$]$^-$ and/or, [AlR$_4$]$^-$ (wherein each R is independently C$_1$, a C$_1$-C$_5$ alkyl group such as a methyl group, an aryl group, e.g. a phenyl or substituted phenyl group, a fluorinated aryl group or combinations thereof). For a further description of such activating co-catalysts, reference is made to the aforementioned U.S. Pat. No. 5,155,080, the entire disclosure of which was previously incorporated herein. In addition, other activating co-catalysts which are suitable for use in the present disclosure include those catalysts which are supported on fluorinated support compositions such as for example and without limitation fluorinated silica supports. Such catalysts may contain MAO, alternatively such catalysts may not contain MAO. As used herein, the terms "fluorinated support composition" and "fluorinated support" mean a support, particulate and porous, that includes fluorine atoms bound to its surface, i.e., one that has been fluorinated in some manner, e.g., treated with at least one inorganic fluorine-containing compound or other fluoriding agent. For example and without limitation suitable fluorinated support compositions may comprise ammonium hexafluorosilicate and ammonium tetrafluoroborate fluorine compounds which are typically solid particulates as are the inorganic oxide, e.g., silicon dioxide, supports. Such compositions are disclosed in U.S. Pat. No. 7,060,766 which is incorporated by reference herein in its entirety.

In addition to the use of an activating co-catalyst, the polymerization reaction may be carried out in the presence of a scavenging agent or polymerization co-catalyst which is added to the polymerization reactor along with the catalyst component and activating co-catalyst. These scavengers can be generally characterized as organometallic compounds of metals of Groups 1A, 2A, and 3B of the Periodic Table of Elements. As a practical matter, organoaluminum compounds are normally used as co-catalysts in polymerization reactions. Specific examples include without limitation triethylaluminum, tri-isobutylaluminum, diethylaluminum chloride, diethylaluminum hydride and the like. Scavenging co-catalysts normally employed may include without limitation methylalumoxane (MAO), triethylaluminum (TEAL), tri-isobutylaluminum (TIBAL) or combinations thereof.

The activators may or may not be associated with or bound to a support, either in association with the catalyst (e.g, FMC) or separate from the catalyst component, such as described by Gregory G. Hlatky, *Heterogeneous Single-Site Catalysts for Olefin Polymerization* 100(4) CHEMICAL REVIEWS 1347-1374 (2000).

In an embodiment, an sPP produced using the catalyst systems and methodologies disclosed herein may exhibit favorable mechanical and physical properties such as for example a high melting temperature, high crystallinity and/or high tacticity as is known to one of ordinary skill in the art. In an embodiment the sPP may have a melting temperature of greater than 160° C., alternatively greater than 165° C., alternatively greater than 170° C. In an embodiment, the sPP may have a molecular weight (Mz) of from 10,000 Daltons to 1,000,000 Daltons, alternatively from 10,000 Daltons to 500,000 Daltons, alternatively from 50,000 Daltons to 400,000 Daltons, alternatively from 100,000 Daltons to 300,000 Daltons.

In an embodiment, the sPP may be further characterized by a narrow molecular weight distribution (Mw/Mn) of less than 5, alternatively less than 4, alternatively less than 3. Specifically, for a polymeric composition the number-average molecular weight $M_n$ is given by equation 1:

$$Mn = \Sigma Nx Mx \quad (1)$$

where Nx is the mole-fraction (or the number-fraction) of molecules whose weight is Mx. Mn is related to polymer properties such as brittleness and flow. The weight-average molecular weight Mw is given by equation 2:

$$Mw = \Sigma wx Mx \quad (2)$$

where wx is the weight-fraction of molecules whose weight is Mx. The Mw is related to polymer strength properties such as tensile strength and impact resistance. In addition to the different average molecular weights of a polymer sample, it is frequently desirable and necessary to know the exact polydispersity (PDI). The PDI is given by equation 3:

$$PDI = Mw/Mn \quad (3)$$

and is further indicative of the modality of the molecular weight distribution. The z-average molecular weight (Mz) is given by equation 4:

$$Mz = \Sigma wx Mx^2 / \Sigma wx Mx \quad (4)$$

where wx is the weight-fraction of molecules whose weight is Mx. Mz is related to polymer ductile properties such as elongation and flexibility.

In an embodiment the sPP may be further characterized by a high degree of crystallinity. sPPs having a "high" amount of crystallinity may also be characterized, at least in part, by a percent crystallinity of equal to or greater than 26%, alternatively equal to or greater than 40%. This high degree of crystallinity may be indicated by the tacticity, heat of fusion, toluene soluble fraction, and/or melting enthalpy of the sPP. For example, the sPP may be characterized by a high tacticity with the percentage of syndiotactic pentads being greater than 95%, alternatively greater than 98%. As described previously, syndiotactity may be expressed as the percentage of syndio pentads (% rmrT). As used herein, the term "syndio pentads" refers to successive methyl groups located on alternate sides of the polymer chain.

The heat of fusion ($H_f$) may also be used to determine the crystallinity of a polymer, according to the procedure described in ASTM E 794-85. For example, samples weighing approximately 7-10 mg may be sealed in sample pans. The differential scanning calorimetric data (DSC) is then recorded by first cooling the sample to about −50° C., and then gradually heating it to about 200° C. at a rate of about 10° C./minute. The sample may then be kept at about 200° C. for about 5 minutes before a second cooling-heating cycle is applied. Both the first and second cycle thermal events are recorded. Areas under the melting peaks may then be measured and used to determine the heat of fusion and the degree of crystallinity. The percent crystallinity may be calculated using the formula: [area under the curve (Joules/gram)/B (Joules/gram)]*100, where B is the heat of fusion for the homopolymer of the major monomer component in the sample. These values for B may be obtained from the literature, e.g., Polymer Handbook, Fourth Edition, published by John Wiley and Sons, New York 1999.

In an embodiment, the sPP may have a toluene soluble fraction of less than 0.5, alternatively less than 0.4, wherein the toluene soluble fraction is the fraction of amorphous or noncrystalline portion of the sPP that is soluble in toluene at room temperature, based on the total weight of the polymer present.

In an embodiment, the sPP may have a crystallization temperature of greater than 100° C., alternatively greater than 105° C., alternatively greater than 114° C. In an embodiment, the sPP may have a melt enthalpy value of greater than 55 J/g, alternatively greater than 60 J/g, alternatively greater than 70 J/g.

In an embodiment, an sPP produced by the methodologies disclosed herein may display mechanical properties, strength, and/or flexibility properties that are improved in comparison to a conventional sPP. In an embodiment, the sPP may exhibit a tensile modulus of equal to or greater than 60,000 psi, alternatively equal or greater than 90,000 psi as determined in accordance with ASTM E2092. The tensile modulus is the ratio of stress to elastic strain in tension. Therefore, the larger the tensile modulus the more rigid the material and the more stress required to produce a given amount of strain.

In an embodiment, the sPP may exhibit a tensile strength at yield of equal to or greater than 2500 psi, alternatively equal to or greater than 3,000 psi, alternatively equal to or greater than 3,600 psi as determined in accordance with ASTM E2092. The tensile strength at yield refers to the tensile stress where an increase in expansion is admitted without an increase in weight on the stress-strain curve.

In an embodiment, the sPP may exhibit a tensile strength at break of equal to or greater than 2,500 psi, alternatively equal to or greater than 3,000 psi, alternatively equal to or greater than 3,900 psi as determined in accordance with ASTM E2092. The tensile strength at break refers to the tensile stress at the moment the material is destroyed.

In an embodiment, the sPP may exhibit an elongation at yield of equal to or greater than 9%, alternatively equal to or greater than 12%, alternatively equal to or greater than 13%, as determined in accordance with ASTM E2092. The elongation at yield refers to the elongation which corresponds to the tensile yield strength.

In an embodiment, the sPP may exhibit an elongation at break of equal to or greater than 250%, alternatively equal to or greater than 300%, alternatively equal to or greater than 400%, as determined in accordance with ASTM E2092. The elongation at break refers to the elongation which corresponds to the tensile breaking strength.

sPPs of the type disclosed herein may be converted into a preform or end-use article through a variety of plastic shaping processes. Plastic shaping processes are known to one skilled in the art and include without limitation injection molding.

In injection molding, resin pellets are poured into a feed hopper, a large open bottomed container, which feeds the granules down to a screw. The screw is turned by a hydraulic or electric motor that turns the screw feeding the pellets up the screw's grooves. The depths of the screw flights decrease towards the end of the screw nearest the mold. As the screw rotates, the pellets are moved forward in the screw and they undergo extreme pressure and friction which generates most of the heat needed to melt the pellets. Heaters on either side of the screw assist in the heating and temperature control around the pellets during the melting process. The screw travel limit switches set the distance the screw moves.

The liquid resin is then injected into the mold. Since the molds are clamped shut by the hydraulics, the heated plastic is forced under the pressure of the injection screw to take the shape of the mold. Water-cooling channels then assist in cooling the mold and the heated plastic solidifies into the part. The cycle is completed when the mold opens and the part is ejected (with the assistance of ejector pins within the mold).

Examples of end use articles into which the sPPs may be formed include pipes, cables, films, bottles, fibers, containers, cups, lids, plates, trays, car parts, blister packs, and so forth. In an embodiment, the end-use article is a packaging container for a consumer product, a food storage container, or a beverage cup. Additional end use articles would be apparent to those skilled in the art.

EXAMPLES

The embodiments having been generally described, the preceding examples are given as particular embodiments and to demonstrate the practice and advantages thereof. It is understood that the examples are given by way of illustration and are not intended to limit the specification of the claims in any manner.

Example 1 sPP samples were prepared using Catalysts 1 and 2, the structures of which are shown below. The polymerization of samples # 1-12 were conducted in bulk propylene using a 2 L Zipper-Clave reactor from Autoclave Engineers. The reactor was charged with 300 g of bulk propylene prior to polymerization. The catalyst was activated with MAO (Zr/Al=1/1000-2000) prior to polymerization. Additional reaction conditions for polymerization reactions carried out with Catalyst 1 and 2 are given in Tables 1 and 2 respectively.

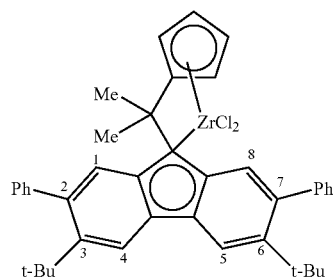

Catalyst 1

-continued

Catalyst 2

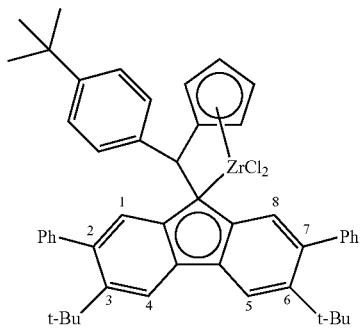

TABLE 1

| # | Catalyst mg | T, °C. | Time, min | H$_2$, ppm | PP, g | Activity, g PP/g cat/h | MFR, dg/min |
|---|---|---|---|---|---|---|---|
| 1[a] | 20 | −10 | 180 | 0 | 2.0 | — | — |
| 2 | 7.0 | 40 | 60 | 0 | 42 | 6,000 | — |
| 3 | 10 | 60 | 30 | 0 | 150 | 30,000 | 3.6 |
| 4[b] | — | — | — | — | — | — | — |
| 5 | 5.5 | 60 | 10 | 60 | 130 | 142,390 | 4.3 |

[a]Polymerization at 1 atm in toluene
[b]Conditions for polymerization were the same as those for #3. Following polymerization the sample was subjected to a heptane extraction for 3 h under reflux after xylene extraction

TABLE 2

| # | Catalyst (mg) | T, °C. | H$_2$, ppm | Poly-mer, g | Activity, g/g//h | MF, g/10 min | % Tol Sol |
|---|---|---|---|---|---|---|---|
| 6 | 0.9 | 20 | 0 | 5.7 | 6,333 | — | — |
| 7 | 0.45 | 40-50 | 0 | 3.6 | 10,526 | — | — |

TABLE 2-continued

| # | Catalyst (mg) | T, °C. | H$_2$, ppm | Poly-mer, g | Activity, g/g//h | MF, g/10 min | % Tol Sol |
|---|---|---|---|---|---|---|---|
| 8 | 1.3 | −10 | 0 | 1.6 | — | — | — |
| 9 | 0.3 | 50 | 30 | 56 | 373,333 | 1.0 | 0.5 |
| 10 | 0.5 | 60 | 60 | 65 | 260,000 | 1.9 | 0.9 |
| 11 | 0.2 | 60 | 30 | 53 | 530,000 | 1.5 | — |
| 12 | 1.5 | 70 | 60 | 146 | 195,000 | 3.2 | 0.6 |

The physical characteristics of the polymer produced in samples #1-#12 were evaluated using previously described techniques and are summarized in Tables 3 and 4. The percentage of syndio pentads (% rrrr) in samples #1 to #5 was not determined.

TABLE 3

| | # | | | | |
|---|---|---|---|---|---|
| | 1 | 2 | 3 | 4 | 5 |
| T melt, °C. | 163.0 | 160.4 | 149.4 | 152.7 | 154.4 |
| T cryst °C. | 109.0 | 98.6 | 89.6 | 97.6 | 109.6 |
| Delta H melt, J/g | 29.6 | 37.0 | 46.3 | 44.7 | 40.8 |
| Delta H recryst, J/g | −39.3 | −97.9 | −59.6 | −49.0 | −109.6 |
| Mw | 222,922 | 169,439 | 161,604 | 186,871 | 149,743 |
| Mw/Mn | 28[a] | 26.5[a] | 5.1 | 1.9 | 4.8 |

[a]Bimodal molecular weight distribution

TABLE 4

| | # | | | | | | |
|---|---|---|---|---|---|---|---|
| | 6 | 7 | 8 | 9 | 10 | 11 | 12 |
| T melt, °C. | 160.0 | 161.9 | 171.0 | 159.7 | 157.7 | 155.7 | 153.4 |
| T cryst °C. | 96.3 | 99.0 | 112.3 | 99.3 | 97.0 | 114.3 | 94.3 |
| Delta H melt, J/g | 53.1 | 52.7 | 35.5 | 52.2 | 53.8 | 51.0 | 50.9 |
| Delta H recryst, J/g | −53.6 | −47.3 | −53.5 | −43.8 | −44.7 | −54.6 | −46.8 |
| Mw | 300.0 | 278.8 | 446,174 | 219,764 | 173,374 | 176,874 | 153,965 |
| Mw/Mn | 2.6 | 2.9 | 3.0 | 2.6 | 2.2 | 2.2 | 2.5 |
| % rrrr | 89.7 | 94.6 | 90.7 | 95.3 | 94.3 | | 93.4 |

Figure 2:
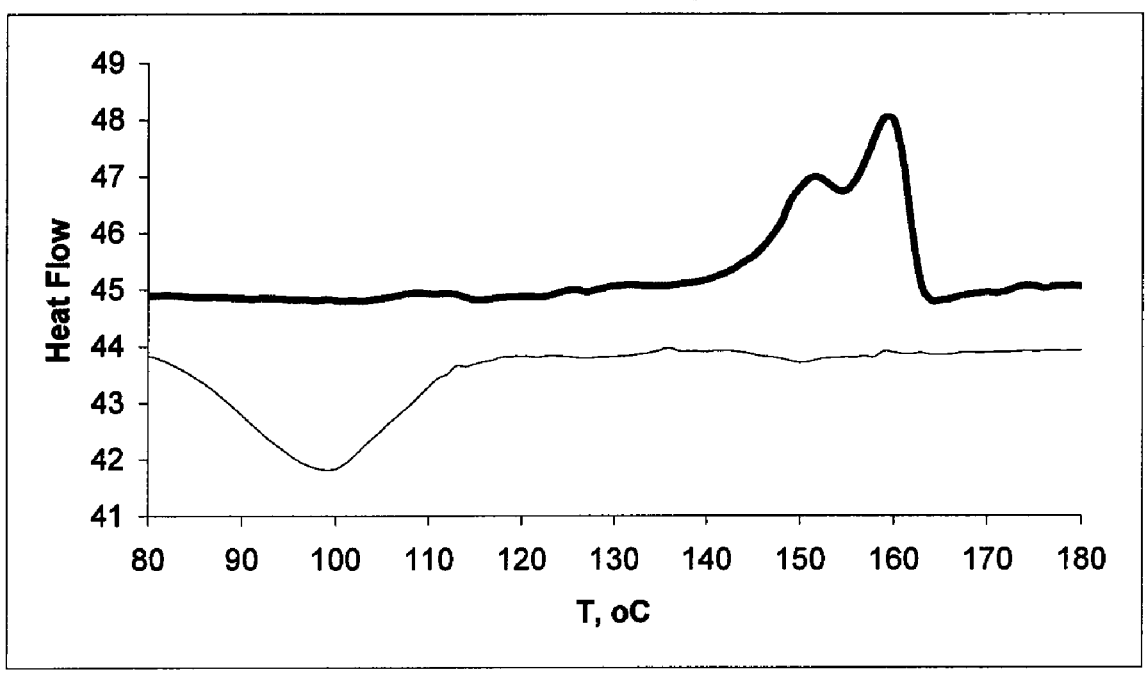
FIG. 2 is a differential scanning calorimetry plot for Sample #9.
Figure 3:
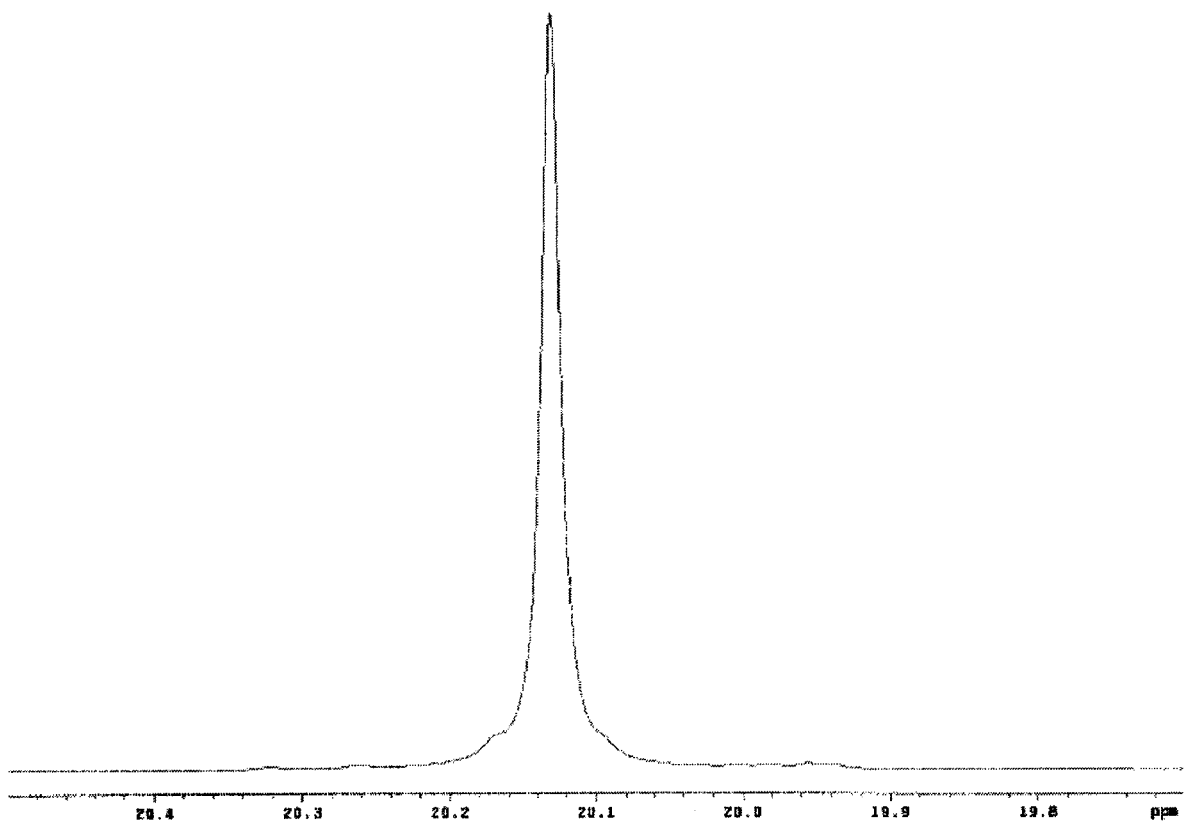
FIG. 3 is a $^{13}C$ NMR spectrum of Sample #9.

Gel permeation chromatography was carried out on sample #9. DSC of sample #8 produced at −10° C. and sample #11 produced at 60° C. are shown in FIGS. 1 and 2 respectively. The results demonstrate the sPP produced using Catalysts 1 and 2 have melting temperatures equal to or greater than 149° C., crystallization temperatures of greater than 89° C. and a high tacticity as measured using $^{13}$C NMR, shown in FIG. 3 with a % rrrr of greater than 89%. Furthermore, the samples produced using Catalyst 2 have a narrow MWD of equal to or less than 3. ,

Example 2

The thermal properties of sPP samples produced as described in Example 1 were investigated. The sPP samples were held at 190° C, for 2 minutes of pre-heat and 2 minutes under pressure to form a 10 mil nominally thick film. Such a thin plaque was chosen to mimic an extruded film as closely as possible. Finally, the samples were then left to cool on the bench top. In Table 5, the % rrrr and MFR of sample #5, produced as described in Example 1, was compared to FINAPLAS 1471 which is a syndiotactic polypropylene commercially available from TOTAL petrochemicals.

TABLE 5

| Resin | MFR (dg/min) | rrrr % by NMR |
|---|---|---|
| FINAPLAS 1471 | 4 | 76.5% |
| sPP (sample 5) | 4.3 | 86.3% |

The thermal properties of several sPP samples produced in Example 1 are given in Table 6. The thermal properties of FINAPLAS 1471 are also presented for comparative purposes.

TABLE 6

| | | FINAPLAS 1471 | #5 | #5 | #9 | #7 |
|---|---|---|---|---|---|---|
| DSC_MELT | Recrystallization Peak | 70.0 | 100.3 | 109.6 | 99.3 | 99.0 |
| | Delta H_Recrystallization | −32.3 | −47.1 | −49.0 | −43.8 | −47.3 |
| | Second Melt Peak | 128.0 | 151.4 | 154.4 | 159.7 | 161.9 |
| | Delta H_Second Melt | 33.9 | 48.9 | 44.7 | 52.2 | 52.7 |
| Tacticity | % rrrr | — | — | — | 95 | 95 |
| | Note | plaque | plaques | fluff | fluff | fluff |

The new sPP samples #1-#12 exhibit higher melting points, higher crystallization temperatures, and larger enthalpies during either crystallization or melting than the comparative resin FINAPLAS 1471. The data in Table 6 demonstrates that the enthalpies of samples #5, #7 and #9 are at least 15 J/g larger in all cases (fluff and plaque) when compared to FINAPLAS 1471, which translates into an approximate 7-8% difference in crystallinity according to the Perkin Elmer method which is described in W. J. Sichina, *DSC as Problem Solving Tool: Measurement of Percent Crystallinity of Thermoplastics*.

In addition, the difference in crystallinity is consistent with the difference in rrrr pentad values of 76.5% for FINAPLAS 1471, 86.3% for sample #5 and 95% for samples #7 and #9. The difference in crystallinity is also consistent with the difference in melting temperatures which are 128° C. for FINAPLAS 1471, 154° C. for sample #5, 160° C. for sample #9 and, 162° C. for sample #7.

Figure 4:
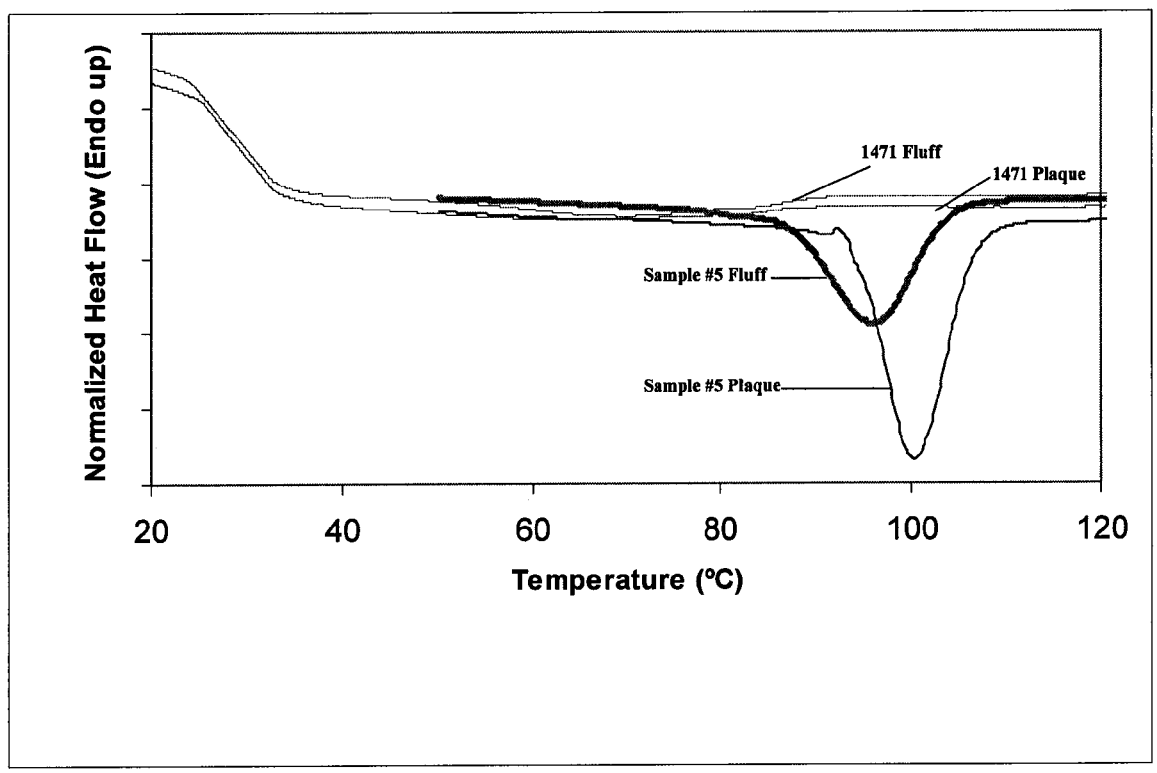
FIG. 4 shows crystallizing and melting curves for FINAPLAS 1471 and Sample #5.

The crystallizing and melting curves for FINAPLAS 1471 and sample #5 in both fluff and plaque forms are shown in FIG. 4. The cooling curves demonstrate that FINAPLAS 1471, in addition to having a lower crystallinity, has an extremely broad crystallization peak relative to sample #5. Whereas the crystallization behavior of FINAPLAS 1471 is typical for an sPP, the behavior of sample #5 is similar to that of an iPP.

Figure 5:
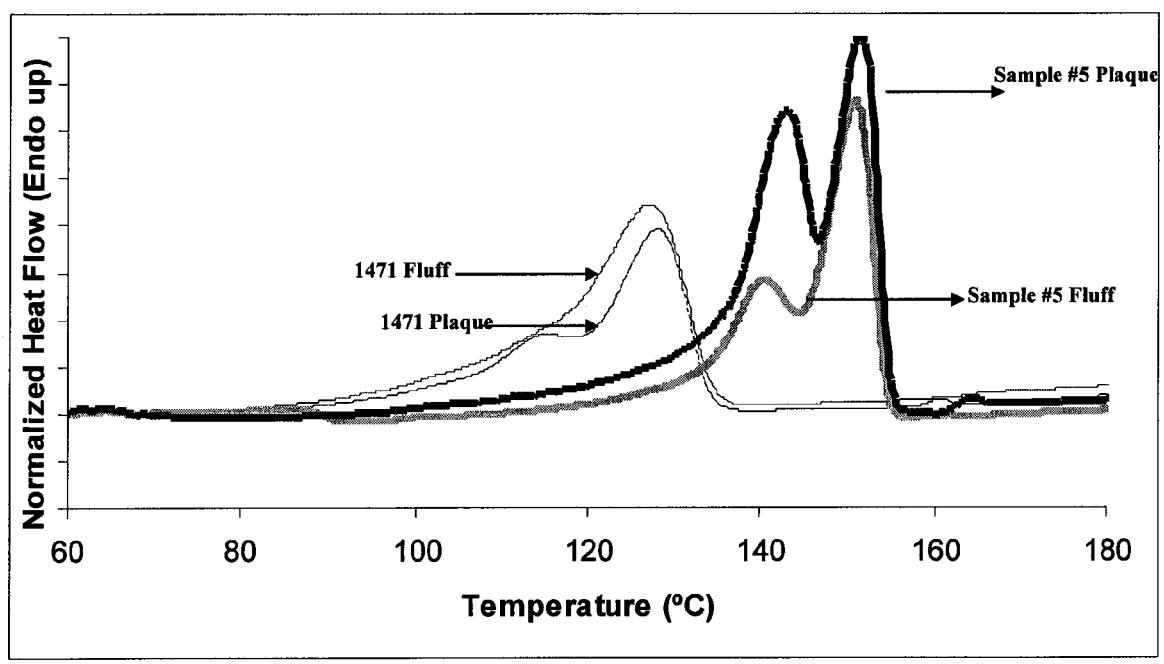
FIG. 5 are plots of melting curves for polypropylene samples.

The melting curves beyond the shift in melting point have exhibited the same general behavior to differing degrees, as shown in FIG. 5. Both FINAPLAS 1471 and sample #5 have demonstrated an increase in the enthalpy associated with a secondary or lower temperature melting peak upon densification by compression molding. The difference in the primary or higher temperature melting peak may be associated with the difference in crystallinity/stereoregularity of each sample. The primary melting peak of sample #5 is reminiscent of the DSC melting trace of isotactic PP. The secondary melting peaks, exhibited prominently by sample #5 in both the fluff and plaque samples, have a corresponding secondary melt peak in the FINAPLAS 1471 plaque. The secondary or lower $T_m$ melting peaks change upon compression molding, increasing in $T_m$ peak position and peak height.

Example 3

The melting and crystallization properties of several samples from Example 1 were compared to the melting and crystallization properties of commercially available polypropylene resins. Both the sPPs of this disclosure and the commercial resins used for comparison are listed in Table 7.

TABLE 7

| Resin | Tm (° C.) | Tc (° C.) | Comment | Form |
|---|---|---|---|---|
| FINAPLAS-1471 | 127 | 63 | Commercial sPP | Fluff |
| EOD 00-31 | 136 | 93 | Commercial mRCP | Fluff |
| 7823MZ | 139 | 90 | Commercial RCP | Fluff |
| 3270 | 165 | 111 | Commercial iPP | Pellet |
| Sample #5 | 151 | 96 | From catalyst 1 | Fluff |
| Sample #9 | 160 | 99 | From catalyst 2 | Fluff |

For injection molding applications, melting temperature and crystallization temperature by DSC give an indication of the performance with regard to cycle time. These values are presented in Table 7 for the sPPs of this disclosure and the comparative commercial resins. An sPP, such as FINAPLAS 1471, is known to have long injection molding cycle times on the order of 90 seconds. Its low crystallization temperature is an indication of this poor cycle time performance. Of the random copolymer PP (RCP) selected for comparison, both RCPs have crystallization temperatures of 90° C. and above with cycle times that are acknowledged to be acceptable. Samples #1-#12 have a crystallization temperature range of 96-114° C., which indicates that samples #1-#12 should possess cycle times comparable to RCPs and iPPs.

Example 4

The mechanical properties of samples produced in Example 1 were investigated. sPP produced with Catalyst 1

Figure 6:
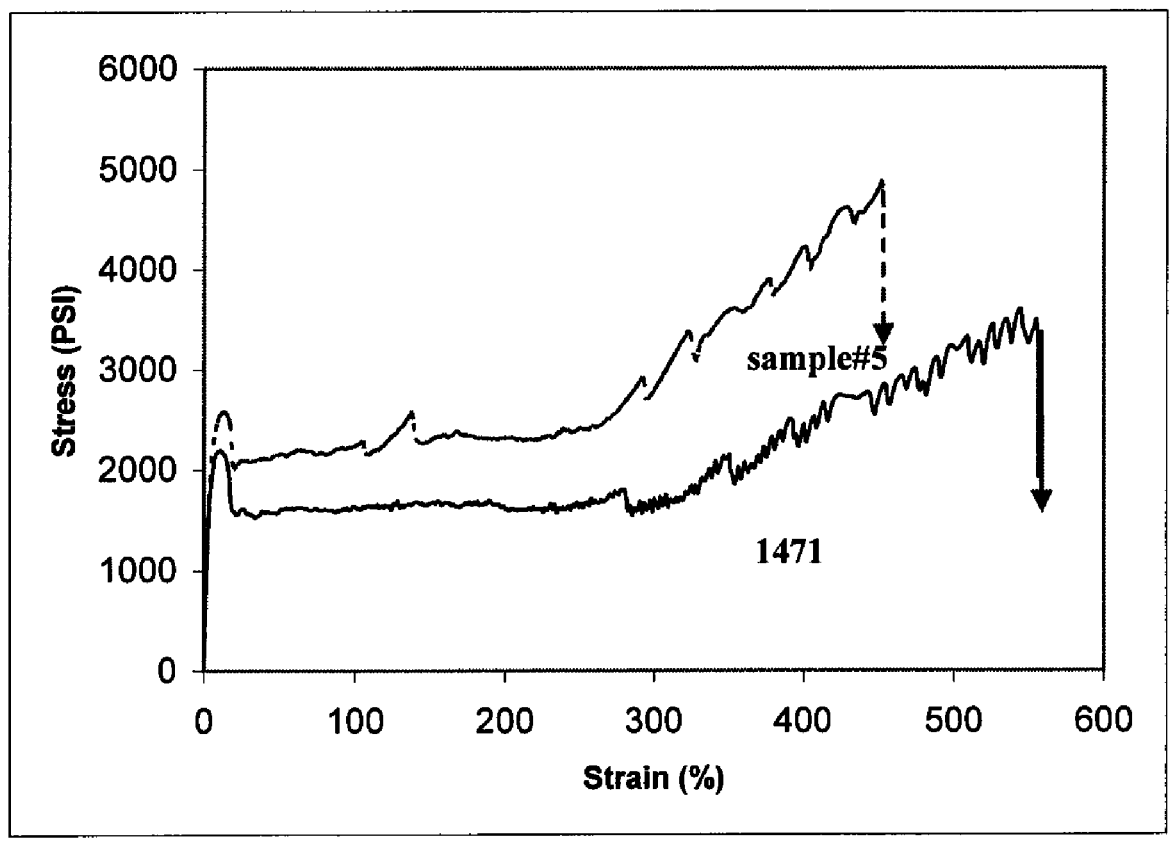
FIG. 6 is a stress versus strain curve for the polypropylene samples of Example 4.

(sample#5) exhibited greater tensile strength and less elongation at break than FINAPLAS 1471 as shown in FIG. 6. The differences in tensile strength and elongation are consistent with sample #5 being a higher crystallinity PP when compared to FINAPLAS 1471.

FINAPLAS 1471 exhibited a lower modulus than sample #5, as listed in Table 8 which gives values for the tensile properties of sample #5 and the commercial sPP FINAPLAS 1471. The difference in tensile moduli is not statistically significant as determined by the student t-test at the 95% confidence interval, but the trend is consistent with sample #5 possessing a higher crystalline content. Yet a closer examination of sample #5 revealed that two of-the tensile moduli were ~10 kpsi versus ~55 kpsi for the other two data points.

TABLE 8

| | | FINAPLAS 1471 (comparison) | # 5 |
|---|---|---|---|
| PP_TENSILE_BARS | Elongation @ Yield | 0.6 | 1.4 |
| | Tensile Modulus | 52812 | 32831 |
| | Tensile Modulus | 4255 | 27601 |
| | Tensile Strength at Yield | 2120 | 2591 |
| | Tensile Strength at Yield | 54 | 67 |
| | Elongation at Yield | 10.8 | 13.1 |
| | Tensile Strength at Break | 2935 | 3867 |
| | Tensile Strength at Break | 263.0 | 515.0 |
| | Elongation at Break | 521 | 401 |
| | Elongation at Break | 36 | 35 |

Overall, sPP produced using catalyst 1 (sample #5) exhibited higher modulus and tensile strength while FINAPLAS 1471 had greater elongation at break. The difference in the room temperature mechanical properties of FINAPLAS 1471 and sample #5 are consistent with the higher crystallinity of sample #5 over FINAPLAS 1471.

Example 5

Figure 7:
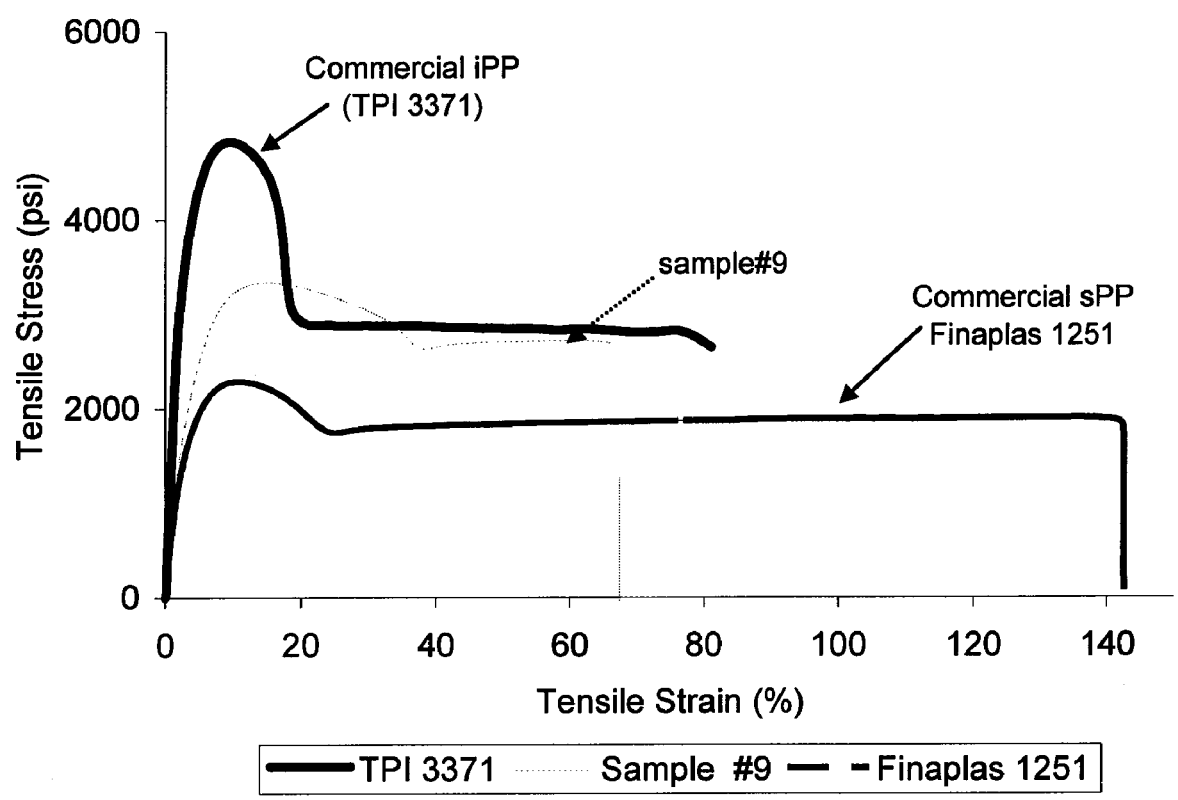
FIG. 7 is a plot of a complex modulus as a function of temperature for the polypropylene samples of Example 5.

Dynamic mechanical analysis (DMA) was employed to characterize sample #9 and to compare the values obtained to that of a commercial sPP (FINAPLAS 1571) and iPP (Total 3652). Solid phase DMA was conducted for the three resins studied. Samples were inserted into the torsion fixtures and a sinusoidal force with a constant frequency (1 rad/sec) and strain amplitude (1%) was applied while ramping the temperature at a rate of 5° C./min. Plotted in FIG. 7 is the complex modulus as a function of temperature. Referring to FIG. 7, it is evident that sample #9 displays a particularly low room temperature modulus that is both comparable to the commercial sPP and in agreement with the instron tensile data. In addition, sample #9 has high melting point characteristics which may provide improved stability at the higher temperatures.

While embodiments have been shown and described, modifications thereof can be made by one skilled in the art without departing from the spirit and teachings of the disclosure. The embodiments described herein are exemplary only, and are not intended to be limiting. Many variations and modifications of the embodiments disclosed herein are possible and are within the scope of the disclosure. Where numerical ranges or limitations are expressly stated, such express ranges or limitations should be understood to include iterative ranges or limitations of like magnitude falling within the expressly stated ranges or limitations (e.g., from 1 to 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the embodiments of the present disclosure. The discussion of a reference herein is not an admission that it is prior art to the present disclosure, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A process of producing syndiotactic polypropylene comprising:
    providing a metallocene catalyst component characterized by the formula:

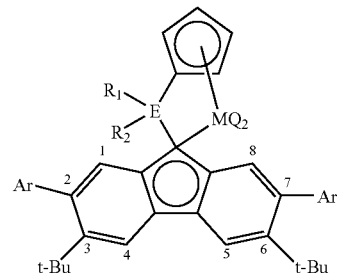

wherein:
Ar is a $C_6$ to $C_{40}$ aromatic group;
$R_1$ and $R_2$ are each independently a hydrogen, a $C_1$-$C_{30}$ alkyl group, a cycloalkyl group, an aryl group or combinations thereof;
E is a —C— group or an —Si— group;
M is titanium, zirconium or hafnium; and
Q is chlorine, a methyl group, a phenyl group, a substituted phenyl, a substituted benzyl group or combinations thereof;
providing a cocatalyst component;
contacting said metallocene catalyst component and said cocatalyst component in a polymerization reaction zone with propylene under slurry or gas phase polymerization conditions to produce said syndiotactic polypropylene polymer; and
recovering said syndiotactic polypropylene from said reaction zone, wherein the syndiotactic polypropylene has a melting temperature of greater than 160° C. and a percentage of syndiotactic pentads greater than 95%.

2. The process of claim 1 wherein M is zirconium and Q is chlorine.

3. The process of claim 1 wherein said cocatalyst component comprises alumoxane, boron-containing activator, fluorine-containing inorganic oxides or combinations thereof.

4. The process of claim 1 further comprising contacting propylene and one or more alpha-olefin comonomers in the reaction zone.

5. The process of claim 1 wherein the process is carried out at a reaction temperature ranging from −20° C. to 100° C.

6. The process of claim 1 wherein the process is carried out at a reaction temperature greater than 60° C.

7. The process of claim 1 wherein the syndiotactic polypropylene has
- a toluene soluble fraction of equal to or less than 0.4; and
- a molecular weight of from 10,000 Daltons to 1,000,000 Daltons.

8. The process of claim 1 wherein the syndiotactic polypropylene has a crystallinity of greater than 26%.

9. The process of claim 1 wherein the syndiotactic polypropylene has a crystallization temperature of greater than 100° C.

10. The process of claim 1 wherein the syndiotactic polypropylene has a melt enthalpy of greater than 55 J/g.

11. The process of claim 1 wherein the syndiotactic polypropylene has
- a tensile modulus of equal to or greater than 60,000 psi;
- a tensile strength at yield of equal to or greater than 3,600 psi;
- a tensile strength at break of equal to or greater than 3,900 psi;
- an elongation at yield of equal to or greater than 13%; and
- an elongation at break of equal to or greater than 400%.

12. The process of claim 1 wherein the syndiotactic polypropylene has;
- a melting temperature of greater than 170° C.;
- a molecular weight of from 100,000 Daltons to 300,000 Daltons;
- a molecular weight distribution of less than 3; and
- a toluene soluble fraction of less than 0.4.

13. The process of claim 12 wherein the syndiotactic polypropylene further exhibits a tensile modulus of equal to or greater than 60,000 psi.

14. The process of claim 12 wherein the syndiotactic polypropylene further exhibits a tensile strength at break of equal to or greater than 2,500 psi.

15. The process of claim 12 wherein the syndiotactic polypropylene further exhibits a tensile strength at yield of equal to or greater than 2,500 psi.

16. The process of claim 12 wherein the syndiotactic polypropylene further exhibits an elongation at yield of equal to or greater than 9%.

17. The process of claim 12 wherein the syndiotactic polypropylene further exhibits an elongation at break of equal to or greater than 250%.

18. The process of claim 1 wherein the syndiotactic polypropylene has a melting temperature of greater than 170° C. and a percentage of syndiotactic pentads greater than 95%.

* * * * *